UNITED STATES PATENT OFFICE.

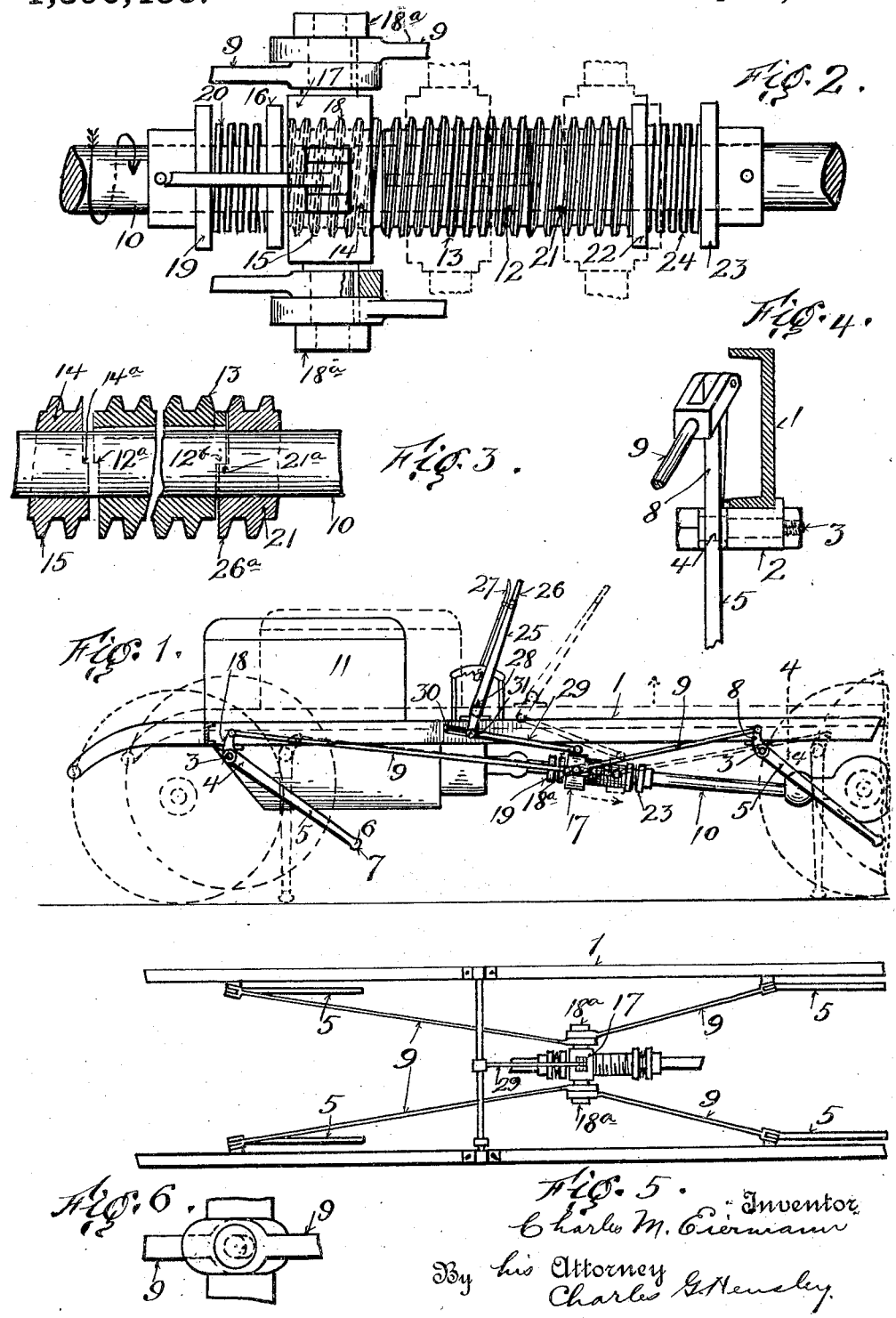

CHARLES M. EIERMANN, OF NEW YORK, N. Y.

AUTOMOBILE ATTACHMENT.

1,390,433.      Specification of Letters Patent.    Patented Sept. 13, 1921.

Application filed October 11, 1920. Serial No. 415,995.

*To all whom it may concern:*

Be it known that I, CHARLES M. EIERMANN, a citizen of the United States, and a resident of the city, county, and State of New York, have invented certain new and useful Improvements in Automobile Attachments, of which the following is a specification.

My invention relates to attachments for automobiles and similar vehicles. The object thereof is to provide means carried by the automobile which is normally held out of contact with the ground but which may be operated to engage the ground and bodily raise the automobile so that its wheels are above or free of the ground. The device is very useful as a means for jacking up the automobile every time it is taken into the garage in order that the weight of the vehicle will not rest on the tires when the vehicle is not in use, and this will prolong the life of the tires. As there is generally more or less oil on the floors of garages the tires of an automobile may be kept free of the oil where the automobile is jacked up each time it is placed in the garage whether for temporary or permanent storage. It is well known that where the tires rest in oil or on an oily floor they are injured by the oil and the life of the tire is materially affected.

The present device is so constructed that the vehicle may be quickly jacked up to hold the tires off the floor every time the automobile is placed in the garage and the operating force for jacking up and lowering the vehicle is derived from the engine of the vehicle so that manual labor other than merely controlling the operation of the device is not required. The device contacts with the ground or floor at different points, preferably at four points near the several wheels, so that the device forms a stand capable of supporting the automobile in an elevated position independently of any other support or guide. While I have designed the present device for use primarily as a jacking apparatus the same may be used in emergencies as a brake to lift the vehicle from the ground and to stop it quicker than can be done through the wheels and tires, especially where the tires have a tendency to slip or skid.

Other advantages will be pointed out in the following detailed description.

In the drawings forming part of this application:

Figure 1 is a general elevation of the device as attached to an automobile.

Fig. 2 is a detail of the sleeve mounted on the transmission shaft.

Fig. 3 is a detail section of the sleeve.

Fig. 4 is a detail of the lever and link construction.

Fig. 5 is a plan view of the general arrangement of parts.

Fig. 6 is a detail of the link connections.

I have shown my invention applied to an automobile with the supporting members arranged near the several wheels. Attached to the frame 1 of the automobile chassis I have shown the brackets 2 which form bearings for the axles 3 of the supporting levers, there being four such brackets in the present showing disposed near the front and rear wheels at each side of the vehicle. There are levers 4 pivoted on these axles the levers each having an arm 5 provided with a shoe 6 which is adapted to engage the ground, floor or other surface on which the vehicle rests, and the under surfaces 7 of the shoes are preferably arched or curved as shown so that the several shoes will not dig into the ground as they are moved downwardly but will have a rocking or rolling action thereon. The several arms 5 in the example shown herein, normally project forwardly of their axles 3 when not in operation, so that they are swung rearwardly when put into operation, although it is not vital that the supporting members be operated in this direction. When the device is out of operation these several arms 5 are all held up sufficiently to provide ample clearance from the ground for such obstacles as the vehicle is likely to be driven over.

The other arms 8 of the supporting levers project above the pivots 3 and to each of these arms there is pivoted one end of a link or pitman 9. The pitmen 9 connected with the levers at the forward end of the vehicle extend rearwardly whereas those which are connected with the rear levers extend forwardly and the ends of these several links or pitmen are connected with common means for operating all of the supporting levers at one time.

The operating force for actuating the supporting levers 4 is derived from the engine of the automobile and I prefer to take the force from the transmission shaft. I have shown the ordinary transmission shaft 10 such as is commonly used in automobiles and which is, of course, operated by the engine 11. On this shaft there is a sleeve 12 which is fixed to the shaft so that it cannot move axially thereof and so that it revolves with the shaft. This sleeve is provided with an exterior screw thread 13 running the length of the sleeve. Beyond one end of the sleeve 12 there is a second sleeve 14 which is loose on the shaft 10 so that the latter may revolve within the sleeve and so that the latter may be shifted axially along the shaft. The sleeve 14 is adapted to be pressed endwise against the fixed sleeve 12 and when it is forcibly pressed against the same it is frictionally revolved by the sleeve 12. These sleeves, therefore, coöperate like the members of a friction clutch for the purpose of causing the movable sleeve 14 to be driven by the fixed sleeve 12. The sleeve 14 is also provided with an exterior screw thread 15 of the same pitch or exactly like the thread 13 on the fixed sleeve 12.

The sleeve 14, on its end opposite to the fixed sleeve 12, has a flange 16 which forms an abutment for a loose collar 17. The latter has an internal thread 18, corresponding and meshing with the threads on the several sleeves 12, 14. The collar 17 has projecting arms 18 at opposite sides and the adjacent ends of the several links of pitmen 9 are pivoted to these arms 18 on the loose collar.

There is a collar 19 on the shaft 10, which is fixed against axial movement on this shaft and between this collar and the sleeve 14 there is a compression spring 20 which normally tends to urge the sleeve 14 into end to end contact with the fixed sleeve 12.

Beyond the opposite end of the fixed sleeve there is another movable sleeve 21 which is slidable axially on the shaft 10 and which is adapted to have end to end contact with the fixed sleeve 12, these sleeves engaging each other like the members of a friction clutch. On the end of the movable sleeve 21 remote from the fixed sleeve 12 there is a flange 22 with which the movable or traveling collar 17 is adapted to engage. Beyond the sleeve 21 there is a collar 23 which is fixed against axial movement on the shaft 10 and between this collar and the sleeve 21 there is a compression spring 24 which normally tends to urge the movable sleeve 21 into end to end contact with the fixed sleeve 12.

The device is controlled by means of a manually operated lever 25 which is so located that the operating handle 26 is within reach of the operator of the automobile, the lever being adapted to be locked in either extreme position by an ordinary clutch 27. This lever is pivoted at 28 and its lower arm has pivoted thereto one end of a link 29 which extends rearwardly and is adapted to actuate the movable sleeves on the transmission shaft. This link has an engaging member 30 for acting on the movable sleeve 17 when the lever 25 is operated in one direction and an engaging member 31 for shifting the sleeve 21 when the lever 25 is operated in the opposite direction.

Operation: The lifting device is adapted to be thrown into operation to raise the vehicle when the shaft 10 is operating forwardly, or as it operates when driving the vehicle forwardly and the shaft is reversed for throwing the present device out of operation. It may be assumed that the automobile has been driven into approximately its position in the garage. Up to this time the lever arms 5 are held in raised position free of the ground and the sleeve 17 is stationary. The operator may now throw over the lever 25 and this will cause the member 30 to release the sleeve 17 so that the latter will be moved under the action of the spring 20. As the sleeve 14 is shifted axially of the shaft 10 it is pressed against the fixed sleeve 12, and as the latter is revolving with the shaft it will revolve the sleeve 14. Owing to the action of the thread 15 of the sleeve 14 on the thread of the collar 17 the collar will be moved along this sleeve 14, and it will advance onto the fixed sleeve 12. The thread on the sleeve 14 will continue to act on the collar as long as any part of the latter engages this sleeve and the thread on the fixed sleeve 12 will also act upon the collar. The collar will finally pass entirely off the sleeve 14 onto the fixed sleeve 12 and then the collar will continue to be moved entirely by the thread on the latter. The collar will travel the length of the sleeve 12 and then onto the sleeve 21 and the thread on the latter will then act on the collar to advance the collar farther. The collar will then pass entirely off the sleeve 12 onto the sleeve 21 and when it comes up against the flange 22 the sleeve 21 will be moved slightly to the right in Fig. 2 and this will release the clutch of the fixed sleeve 12 upon the sleeve 21 and the latter will cease to be revolved. The travel of the collar 17 to the right in Fig. 2 will be thus automatically terminated, even though the engine continues to revolve the shaft 10.

During the above movement or travel of the collar 17 the several links 9 operate to swing all the arms 5 downwardly until their lower ends or shoes 6 engage the ground and until the vehicle is lifted up to raise the wheels off the ground. When the collar 17 is fully on the sleeve 21 the engine may be stopped, leaving the vehicle jacked up on the several levers 4.

To lower the vehicle the engine is started and the shaft 10 is reversed; that is, it is operated in the same direction as for moving the automobile backwardly. The hand lever 25 is swung in the reverse direction to the first operation and this will force the movable sleeve 21 into engagement with the fixed sleeve 12 and the former will be frictionally revolved by the latter in the opposite direction to its first described operation. The thread 32 on the sleeve 21 will cause the collar 17 to move to the left in Fig. 2. When the collar 17 reaches the sleeve 12 the thread on the latter will come into operation on the collar and the latter will move from the sleeve 21 onto the sleeve 12 and along the latter to the sleeve 14. The collar will then be taken by the thread 15 on the sleeve 14 and the collar will travel until it strikes the flange 16 whereupon the sleeve 14 will be moved slightly to disengage from the sleeve 12. The sleeve 14 will then be at rest. During the above movement of the collar the lever arms 5 are rocked on their pivots 3 until the vehicle is lowered on to its wheels and until the arms 5 are swung up sufficiently to be clear of any objects over which the vehicle is likely to run.

In case of emergency the device may be operated to raise the vehicle partly or wholly off the tires and stop the vehicle quickly, in which the case the device will serve as an emergency brake.

It will be apparent from the above description that I have provided simple means for jacking up an automobile using the engine thereof for operating the device and that the vehicle may be entirely lifted off the tires. The device is so simple to operate that the vehicle may be jacked up every time it is placed in the garage thus prolonging the life of the tires and preserving their elasticity.

Having described my invention, what I claim is:—

1. In a device of the class described the combination with an automobile having power driving means and a transmission shaft, of a plurality of pivotal members carried by the automobile and adapted to bodily raise the automobile and to support it in an elevated position and means mounted on said transmission shaft for operating said raising means.

2. In a device of the class described the combination with an automobile having power driving means, a plurality of levers pivoted to said automobile and having arms adapted to engage the ground and to bodily lift the automobile for the purpose set forth, said levers being arranged toward the front and rear of said automobile and all thereof arranged to swing in the same direction in raising or lowering the automobile, and means for operating said levers simultaneously in the same direction, including a threaded member revolved by said power driving means, a traveling member engaging said threaded member and adapted to be reciprocated thereby, and adapted to operate said levers, and manually controlled means for setting said device into operation.

3. In a device of the class described the combination with an automobile, pivoted means mounted on said automobile and adapted to engage the ground and to lift the automobile, and means for operating said lifting means including a shaft, a sleeve fixed to said shaft and having a thread thereon, a loose sleeve on said shaft at each end of said fixed sleeve, said loose sleeves having threads thereon, a threaded collar coöperating with each of said sleeves to be operated thereby for moving said lifting means, and means for causing either of said loose sleeves to be operated by said fixed sleeve.

4. In a device of the class described the combination with an automobile, pivoted means mounted thereon, and adapted to engage the ground and to lift the automobile and means for operating said lifting means including a shaft, a sleeve fixed to said shaft and having a thread thereon, a loose sleeve on said shaft at each end of said fixed sleeve and adapted to frictionally clutch the fixed sleeve, said loose sleeves having threads thereon, traveling threaded means operated by said sleeves and adapted to operate the lifting means, and means for causing either of said loose sleeves to clutch said fixed sleeve to be revolved by the latter.

5. In a device of the class described the combination with an automobile, of pivoted means mounted thereon and adapted to engage the ground and to lift the automobile, and means for operating said lifting means, including a shaft, a sleeve fixed to said shaft and having a thread thereon, a loose sleeve on said shaft at each end of said fixed sleeve, said loose sleeves having threads thereon, traveling threaded means operated by said sleeves and adapted to operate the lifting means, and means for pressing either of said loose sleeves into frictional engagement with the fixed sleeve whereby they will be revolved by the latter.

6. In a device of the class described, the combination with an automobile, of pivoted means mounted thereon and adapted to engage the ground and to lift the automobile, and means for operating said lifting means, including a shaft, a sleeve fixed thereto and having a thread thereon, a loose sleeve on said shaft at each end of said fixed sleeve, said loose sleeves having threads thereon, traveling threaded means operated by said sleeves and adapted to operate the lifting means and means for pressing either of said loose sleeves into operative engagement with the fixed sleeve, said loose sleeves being adapted to be released from operative engagement with the fixed sleeve by said traveling means.

7. In a device of the class described the combination with an automobile, of pivoted means mounted thereon and adapted to engage the ground and to lift the automobile, and means for operating said lifting means, including a shaft, a sleeve fixed thereon and having a thread thereon, a loose sleeve on said shaft at each end of said fixed sleeve, said loose sleeves having threads thereon, traveling threaded means operated by said sleeves and adapted to operate the lifting means, springs tending to force said loose sleeves into operative engagement with said fixed sleeve, said loose sleeves being adapted to be moved out of operative engagement with the fixed sleeve by said traveling means, and manually operated means for controlling the operative engagement of either of said loose sleeves with the fixed sleeve.

Signed at the city, county and State of New York, this 1st day of October, 1920.

CHARLES M. EIERMANN.